United States Patent [19]
Yamamoto et al.

[11] Patent Number: 5,178,952
[45] Date of Patent: Jan. 12, 1993

[54] RADIATION CURABLE RESIN, COMPOSITION THEREOF AND PRECOATED METAL MADE THEREFROM

[75] Inventors: Shinpei Yamamoto; Hideyuki Ohashi; Tadashi Nakajima; Nobukazu Kotera, all of Otsu; Takuma Kobayashi, Tsuruga; Hiroshi Taki, Otsu; Masami Oka, Tsuruga, all of Japan

[73] Assignee: Toyo Boseki Kabushiki Kaisha, Osaka, Japan

[21] Appl. No.: 502,406

[22] Filed: Mar. 30, 1990

[30] Foreign Application Priority Data

Mar. 30, 1989 [JP] Japan .................. 1-80417
Jun. 22, 1989 [JP] Japan .................. 1-160453
Oct. 28, 1989 [JP] Japan .................. 1-280574

[51] Int. Cl.$^5$ .............. C08F 283/04; C08F 2/50; B32B 27/40; C08G 18/44
[52] U.S. Cl. .................. 428/425.8; 522/96; 525/450; 525/451; 525/455
[58] Field of Search .......... 522/96; 428/425.8

[56] References Cited

U.S. PATENT DOCUMENTS

| | | | |
|---|---|---|---|
| 4,082,634 | 4/1978 | Chang | 428/425.8 |
| 4,097,439 | 6/1978 | Darling | 528/75 |
| 4,339,566 | 7/1982 | Rosenkranz et al. | 522/96 |
| 4,477,327 | 10/1984 | Cassatta et al. | 522/96 |
| 4,562,714 | 1/1986 | Tanaka et al. | 428/425.8 |
| 4,683,280 | 7/1987 | Ukachi et al. | 528/71 |
| 4,880,890 | 11/1989 | Miyabayashi et al. | 428/425.8 |
| 4,954,199 | 9/1990 | Rains et al. | 428/425.8 |

FOREIGN PATENT DOCUMENTS

| | | |
|---|---|---|
| 0033897 | 8/1981 | European Pat. Off. |
| 0085722 | 8/1983 | European Pat. Off. |
| 0249222 | 12/1987 | European Pat. Off. |
| 3529225 | 2/1986 | Fed. Rep. of Germany |

OTHER PUBLICATIONS

Kaoru Nakajima et al., "Magnetic Recording Medium", May 16, 1984, Database Japs. Abstract JP-A-59084337.

*Primary Examiner*—Marion E. McCamish
*Assistant Examiner*—Susan Berman
*Attorney, Agent, or Firm*—Wegner, Cantor, Mueller & Player

[57] ABSTRACT

A radiation curable resin having at least two (meth)acryloyl groups at both terminal ends of a molecular chain which is obtained by reaction of (1) a polyester polyol and/or polycarbonate polyol, (2) a diisocyanate, (3) a polyfunctional (meth)acrylate containing a hydroxyl group therein, and optionally (4) a compound having at least two active hydrogens in the molecule is disclosed. The resin has at least two (meth)acryloyl groups at a terminal end of the molecular chain. The molecular weight of the resin is 1,000 to 50,000, the urethane bonding concentration is not more than 3,000 equivalent/$10^6$ g and the (meth)acryloyl group concentration is 100 to 6,000 equivalent/$10^6$ g. A radiation curable resin composition containing the resin and a precoated metal using the composition are also disclosed.

5 Claims, No Drawings

RADIATION CURABLE RESIN, COMPOSITION THEREOF AND PRECOATED METAL MADE THEREFROM

FIELD OF INVENTION

The present invention relates to a radiation curable resin and a composition thereof. The resin and composition of the present invention have good storage stability and curing characteristics by radiation, and a film obtained by curing thereof has good solvent resistance, boilproof properties, weather resistance and stain resistance. Further, the present invention relates to a radiation curable coating composition useful for a precoated metal having the above excellent properties.

BACKGROUND OF THE INVENTION

Curing processes of radiation curable resins and resin compositions are resource-saving and energy-saving and films having excellent properties can be obtained. Therefore, application thereof has been developed in various adhesives, coating agent, inks, coating compositions, binders for magnetic recording media and the like.

Particularly, radiation curable urethane resin has good properties such as good curing characteristics by radiation, toughness of a film obtained by curing and the like and, therefore, it has been studied in the above various fields (for example, see Japanese Patent Kokai No. 52-17517, U.S. Pat. No. 4,082,634, U.S. Pat. No. 4,097,439, U.S. Pat. No. 4,552,932, Canadian Patent No. 1,192,330 and European Patent Published Application No. 0 264 551 A).

However, the conventional radiation curable urethane resin or its composition having good curing characteristics by radiation has a drawback that radicals are liable to be formed, which results in poor storage stability. Further, among properties of a film obtained by curing, regarding solvent resistance, boilproof properties, weather resistance and stain resistance, any radiation curable resin having sufficient properties has not been found heretofore in the prior art.

Recently, there has been a great increase in a demand for precoated metals in various products for indoor applications such as household electric appliances, for example, refrigerators, washing machines and the like, business machines, interior construction materials as well as products for outdoor applications such as roof covers and side walls of houses and the like. In these fields, a radiation curable coating composition which satisfies the above solvent resistance, boilproof properties and weather resistance has also been desired. However, any coating composition having sufficient properties has not been found in the prior art, either.

Among the conventional precoated metals using thermoset coating compositions which have been widely used, particularly regarding precoated metals used for indoor products, color layers to which various pigments are added are formed on their outermost layers from the viewpoint of design. However, with such a technique, properties and appearance of the products are limited. Therefore, it has been desired to develop a precoated metal which overcomes the above limit in the conventional precoated metals.

OBJECTS OF THE INVENTION

One object of the present invention is to provide a radiation curable resin or resin composition having excellent storage stability, curing characteristics by radiation, hardness and workability as well as being able to give good film properties to a film obtained therefrom, particularly good solvent resistance, boilproof properties, weather resistance and stain resistance.

Another object of the present invention is to provide a radiation curable coating composition having good film properties after curing which is useful for a precoated metal.

Still another object of the present invention is to provide a precoated metal having excellent appearance, design and properties which has not been found in the conventional precoated metal.

These objects as well as other objects and advantages of the present invention will become apparent to those skilled in the art from the following description.

SUMMARY OF THE INVENTION

According to the present invention, there is provided a radiation curable resin which is a reaction product of:
(1) a polyester polyol and/or polycarbonate polyol,
(2) a diisocyanate,
(3) a polyfunctional (meth)acrylate containing a hydroxyl group therein, and optionally
(4) a compound having at least two active hydrogen atoms in the molecule thereof, said resin having at least two (meth)acryloyl groups at a terminal end of the molecular chain thereof, the molecular weight of said resin being 1,000 to 50,000, the concentration of urethane bond thereof being not more than 3,000 equivalent/$10^6$ g and the concentration of (meth)acryloyl group thereof being 100 to 6,000 equivalent/$10^6$ g.

The present invention also provides a radiation curable resin composition which comprises the above radiation curable resin of the present invention and a (meth)acrylate compound, a concentration of (meth)acryloyl group in said composition being 400 to 9,000 equivalent/$10^6$ g.

Further, the present invention provides a precoated metal comprising a metal base and a coat on at least one surface of the metal based formed by curing the above composition of the present invention.

The terms "(meth)acrylate" and "(meth)acryloyl" used herein mean both acrylate and methacrylate as well as both acryloyl and methacryloyl.

DETAILED DESCRIPTION OF THE INVENTION

The above polyester polyol (1) to be used in the present invention is mainly composed of a dicarboxylic acid component and a glycol component.

Examples of the dicarboxylic acid component include aromatic dicarboxylic acids such as terephthalic acid, isophthalic acid, orthophthalic acid, 1,5-naphthalic acid and the like; aromatic hydroxycarboxylic acids such as p-hydroxybenzoic acid, p-(hydroxyethoxy)benzoic acid and the like; aliphatic dicarboxylic acids such as succinic acid, adipic acid, azelaic acid, sebacic acid, dodecane dicarboxylic acid and the like; and unsaturated aliphatic and alicyclic dicarboxylic acids such as fumaric acid, maleic acid, itaconic acid, hexahydrophthalic acid, tetrahydrophthalic acid and the like. If necessary, the dicarboxylic acid component may further contain a small amount of tri- and tetracarboxylic acids such as trimellitic acid, trimesic acid, pyromellitic acid and the like.

Examples of the glycol component include diols such as ethylene glycol, propylene glycol, 1,3-propanediol, 1,4-butanediol, 1,5-pentanediol, 1,6-hexanediol, neopentyl glycol, diethylene glycol, dipropylene glycol, 2,2,4-trimethyl-1,3-pentanediol, 1,4-cyclohexanedimethanol, spiroglycol, 1,4-phenylene glycol, ethylene oxide adduct of 1,4-phenylene glycol, ethylene oxide and propylene oxide adducts of bisphenol A, ethylene oxide and propylene oxide adducts of hydrogenated bisphenol A, polyethylene glycol, polypropylene glycol, polytetramethylene glycol and the like. If necessary, the glycol component may further contain a small amount of triols and tetraols such as trimethylolethane, trimethylolpropane, glycerin, pentaerythritol and the like.

In order to obtain a copolymerized polyester polyol from the above dicarboxylic acid component and glycol component, the synthesis can be carried out by using the glycol ingredient in an excess amount in comparison with the carboxylic acid ingredient. Preferably, the synthesis of the copolymer is carried out so that a concentration of the carboxyl terminal group is less than 50 equivalent/$10^6$ g of the copolymerized polyester. When the concentration of the carboxyl terminal group is not less than 50 equivalent/$10^6$ g, the desired urethane acrylate can hardly be obtained because too many inactive groups are formed in the reaction with the diisocyanate during the synthesis of the urethane resin as described hereinafter.

Where weather resistance is particularly of importance for the radiation curable resin of the present invention, the amount of the aromatic dicarboxylic acid in the dicarboxylic acid component of the polyester polyol is preferably not less than 40 mole % and the amount of the aliphatic dicarboxylic acid is preferably not more than 60 mole %. When the amount of the aliphatic dicarboxylic acid exceeds 60 mole %, weather resistance and hardness of a film become inferior and, when the amount of the aromatic dicarboxylic acid is less than 40 mole %, stain resistance is liable to become inferior. Therefore, the amount of the aromatic dicarboxylic acid is more preferably not less than 50 mole %.

For further improving curing characteristics of the radiation curable resin of the present invention, it is effective that not less than 10 mole % of a dicarboxylic acid having cycloalkyl group is contained in the dicarboxylic acid component of the polyester polyol.

Further, for improving adhesive properties to a base material and mechanical properties of a film of the radiation curable resin of the present invention, it is effective to use, as the polyester polyol, that having a glass transition point of not lower than 20° C. in combination with that having a glass transition point of lower than 20° C. It is more effective to used the polyester polyol having a glass transition point of lower than 0° C.

Furthermore, in the case that pigments are added to the radiation curable resin of the present invention, for further improving dispersibility of the pigments, it is effective that the radiation curable resin contains a hydrophilic polar group in a concentration of 5 to 2,000 equivalent/$10^6$ g.

Examples of the hydrophilic polar group include:

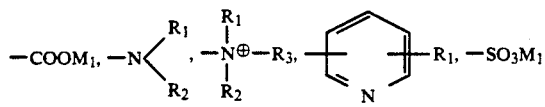

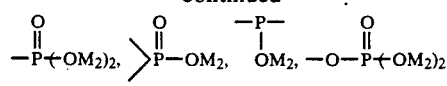
-continued wherein $M_1$ is hydrogen, alkaline metal, tetra($C_1$-$C_8$)alkyl ammonium and tetra($C_1$-$C_8$)alkyl phosphonium, $M_2$ is hydrogen, alkaline metal, monovalent $C_1$-$C_8$ hydrocarbon group and amino group, and $R_1$ to $R_3$ are hydrogen, $C_1$-$C_8$ alkyl, $C_6$-$C_{14}$ aryl and $C_7$-$C_{15}$ aralkyl.

The above polycarbonate polyol (1) to be used in the present invention is that synthesized according to, for example, the following method:

(A) an ester interchange reaction of a dihydroxy compound with a diester of carbonic acid obtained from a monofunctional hydroxy compound;

(B) an ester interchange reaction of a dihydroxy compound with a bisalkyl- or bisarylcarbonate compound of the dihydroxy compound or another dihydroxy compound;

(C) a reaction of a dihydroxy compound with phosgene in the presence of an acid binder; and (D) a reaction of a dihydroxy compound with a bischlorocarbonate of a dihydroxy compound in the presence of an acid binder.

Examples of the dihydroxy compound include a polyol component of the above polyester polyol and compounds having a phenolic hydroxyl group such as 4,4'-isopropylidene diphenol, 4,4'-sulfondiphenol, hydroquinone, 4-hydroxyphenylphenol, 4-hydroxyphenoxyphenol, 4-hydroxyphenacylphenol and the like.

For further improving curing characteristics and film properties, it is effective to use the polyester polyol in combination with the polycarbonate polyol. A preferred weight ratio of the polyester polyol having at least two hydroxyl groups in the molecule and the polycarbonate polyol having at least two hydroxyl groups in the molecule is 1:9 to 9:1. When the proportion is out of this range, the characteristics that both Young's modulus and elongation of the resin are high is lost.

A preferred molecular weight of the polyester polyol having at least two hydroxyl groups in the molecule is 500 to 20,000, more preferably, 500 to 6,000, and the polycarbonate polyol having at least two hydroxyl groups in the molecule is 500 to 20,000, more preferably, 500 to 6,000. When the molecular weight is less than 500, the resulting radiation curable resin lacks flexibility (i.e. high elongation and high workability being hardly obtained) and, when the molecular weight exceeds 20,000, the distance between crosslinked points formed by irradiation of the resulting radiation curable resin becomes too far, which results in insufficient crosslink density and desired properties can hardly be obtained.

In order to obtain the urethane acrylate from these polyester polyol and/or polycarbonate polyol (1), the above polyester polyol and/or polycarbonate, the diisocyanate compound (2), the polyfunctional (meth)acryalte compound containing a hydroxy group (3) and optionally a polyol other than (1) and/or polyamine are reacted.

Examples of the diisocyanate compound (2) include 2,4-tolylene diisocyanate, 2,6-tolylene diisocyanate, p-phenylene diisocyanate, diphenylmethane diisocyanate, m-phenylene diisocyanate, hexamethylene diisocyanate, tetramethylene diisocyanate, 3,3'-dimethoxy-4,4'-biphenylene diisocyanate, 2,4-naphthalene diisocyanate, 3,3'-dimethyl-4,4'-biphenylene diisocyanate, 4,4'-diphenylene diisocyanate, 4,4'-diisocyanate diphenyl ether, 1,5-naphthalene diisocyanate, p-xylylene diisocyanate, m-xylylene diisocyanate, 1,3-diisocyanate methylcyclohexane, 1,4-diisocyanate methylcyclohexane, 4,4'-diisocyanate dicyclohexane, 4,4'-diisocyanate dicyclohexylmethane, isophorone diisocyanate and the like.

Among these, it is preferred to use alicyclic and aliphatic diisocyanate compounds from the viewpoint of weather resistance. When the alicyclic diisocyanate compound is used, curing characteristics by radiation is further improved and the effect of the present invention can be further enhanced. Further, weather resistance of the cured film is better than that obtained by using the alicyclic compound as the dicarboxylic acid component or glycol component of the polyester polyol and, in addition, storage stability of the resin composition itself is further improved.

Examples of the polyfunctional (meth)acrylate compound containing a hydroxyl group (3) to be used in the present invention include mono(meth)acrylates and di(meth)acrylates of triol compounds such as trimethylolpropane, glycerin, trimethylolethane and the like; and hydroxyl group containing (meth)acrylates of tetrahydric or higher polyols such as pentaerythritol, dipentaerythritol and the like. These compounds may be used alone or in combination thereof.

In view of weather resistance, it is preferred that the urethane acrylate resin which is the radiation curable resin of the present invention has a relatively low concentration of urethane bond. The concentration of urethane bond in the urethane acrylate resin should be not more than 3,000 equivalent/$10^6$ g, preferably, not more than 2,000 equivalent/$10^6$ g, most preferably, not more than 1,690 equivalent/$10^6$ g. When the concentration of urethane bond exceeds 3,000 equivalent/$10^6$ g, as described above, weather resistance becomes inferior.

Where stain resistance and weather resistance are particularly of importance, the polyfunctional (meth)acrylate compound containing a hydroxyl group (3) of the present invention is preferably a compound containing at least one hydroxyl group and at least two (meth)acryloyl groups in the molecule. Examples thereof include di(meth)acrylates of triols such as trimethylolpropane di(meth)acrylate, glycerin di(meth)acrylate, trimethylolethane di(meth)acrylate and the like; and one or two hydroxyl groups containing (meth)acrylated tetrahydric or higher polyols wherein not less than two hydroxyl groups of polyols are (meth)acrylated such as pentaerythritol di(meth)acrylate, pentaerythritol tri(meth)acrylate, dipentaerythritol tetra(meth)acrylate, dipentaerythritol penta(meth)acrylate and the like. It is desirable that less than three hydroxyl groups are retained because otherwise ramification is formed during the production of the urethane resin of the present invention and gelation is liable to be caused. The terms "di-, tri-, tetra- and penta(meth)acrylate" used above include those wherein a part thereof is acrylate and another part thereof is methacrylate. Among them, the compounds having one hydroxyl group and at least two (meth)acrylate groups are most preferred. They can be used alone or in combination thereof.

Fundamentally, the polyfunctional (meth)acrylate containing a hydroxyl group (3) of the present invention introduces a plurality of (meth)acryloyl groups at the terminal ends of the urethane acrylate resin by reaction of the hydroxyl group contained therein with the isocyanate group of the above diisocyanate compound (2).

For manifesting the advantages of the present invention, that is, excellent curing characteristics, stain resistance, solvent resistance as well as weather resistance, it is necessary to form strong crosslinking at the terminal ends of the molecule of the urethane resin. The advantages of the present invention can hardly be obtained by using a monofunctional (meth)acrylate compound containing a hydroxyl group alone.

Further, when introduction of a plurality of unsaturated double bonds at the ends of the molecule by using an isocyanate having tri or higher functionality is employed, the concentration of urethane bond becomes unnecessarily higher, which results in inferior weather resistance, and gelation is liable to be caused by a ramification reaction.

In order to adjust the molecular weight of the urethane acrylate resin, if necessary, polyol and/or polyamine other than the above (1) and (3) components are used. Examples of such a compound include glycols as described with respect to the above glycol compounds of the copolymerized polyester polyol (1); aminoalcohols such as monoethanolamine, N-methylethanolamine and the like; diamines such as ethylenediamine, hexamethylenediamine, isophoronediamine, piperazine, 4,4'-diaminodiphenylmethane and the like. Alternatively, water can be used.

The production of the urethane resin of the present invention can be carried out by, for example, a method comprising reacting the copolymerized polyester polyol (1) with the diisocyanate compound (2) to obtain an isocyanate terminated prepolymer and then reacting the prepolymer with the polyfunctional (meth)acrylate compound containing a hydroxyl group (3) and optionally the polyol and/or polyamine (4) other than the above compounds (1); a method comprising reacting the polyfunctional (meth)acrylate compound containing a hydroxyl group (3) with the diisocyanate compound (2) to obtain a compound having an isocyanate group and a plurality of (meth)acrylate groups and reacting the resulting compound with the copolymerized polyester polyol (1); a method comprising charging the compounds to be reacted at once in a reaction vessel to carry out the reaction; or the like. However, the production of the urethane resin of the present invention is not limited to these methods.

The molecular weight of the urethane acrylate resin of the present invention thus obtained should be in the range of between 1,000 and 50,000. When the molecular weight is less than 1,000, workability of the cured film is remarkably deteriorated and, when the molecular weight exceeds 50,000, compatibility to a (meth)acrylate compound as described hereinafter becomes inferior. In order to improve compatibility, the molecular weight is preferably not more than 20,000.

Further, the present invention provides a composition comprising the above radiation curable resin and a (meth)acrylate compound.

The (meth)acrylate compound used in the present invention is a monofunctional or polyfunctional (meth)acrylate compound. The polyfunctional (meth)acrylate compound used is a compound having at least two (meth)acryloyl groups in the molecule, which is obtained by reaction of a polyhydric alcohol with a (meth)acrylic acid. Examples thereof include di(meth)acrylates of dihydric alcohols such as ethylene glycol di(meth)acrylate, propylene glycol di(meth)acrylate, butanediol di(meth)acrylate, pentanediol di(meth)acrylate, hexanediol di(meth)acrylate, diethylene glycol di(meth)acrylate, polyethylene glycol di(meth)acrylate, neopentyl glycol mono(meth)acrylate, hydroxypivalic acid neopentyl glycol di(meth)acrylate, dipropylene glycol di(meth)acrylate, tripropylene glycol di(meth)acrylate, bisphenol A di(meth)acrylate, ethylene oxide modified phosphoric acid di(meth)acrylate, ethylene oxide modified bisphenol A di(meth)acrylate and the like; tri(meth)acrylates of trihydric alcohols such as trimethylolethane tri(meth)acrylate, trimethylolpropane tri(meth)acrylate, glycerin tri(meth)acrylate, propylene oxide modified trimethylolpropane tri(meth)acrylate and the like; and (meth)acrylated tetra- or higher hydric alcohols such as pentaerythritol tri(meth)acrylate, pentaerythritol tetra(meth)acrylate, dipentaerythritol hexa(meth)acrylate, ditrimethylolpropane tetra(meth)acrylate and the like. Good stain resistance, solvent resistance and weather resistance can hardly be obtained by using a mono(meth)acrylate compound alone.

The above compound is used alone or in combination thereof.

In the radiation curable resin composition of the present invention, the radiation curable resin and the (meth)acrylate compound are formulated in such an amount that a concentration of (meth)acryloyl group the resin composition is 400 to 9,000 equivalent/$10^6$ g, preferably, 3,000 to 9,000 equivalent/$10^6$ g, more preferably, 4,000 to 9,000 equivalent/$10^6$ g. When the concentration of the (meth)acryloyl group is less than 400 equivalent/$10^6$ g, the crosslink density becomes too low, which results in deterioration of stain resistance and solvent resistance and, when the concentration exceeds 9,000 equivalent/$10^6$ g, the crosslink density becomes too high, which provides only a film having no workability and, in the severe case, causes cracking of a film during curing.

Where stain resistance is particularly of importance in the radiation curable resin composition, the (meth)acrylate compound used is that having at least one (meth)acryloyl group and at least one hydroxyl group in the molecule, and the preferred molecular weight is about 100 to 1,000.

Examples of the compound include mono(meth)acrylates of dihydric alcohols such as ethylene glycol mono(meth)acrylate, propylene glycol mono(meth)acrylate, butanediol mono(meth)acrylate, pentanediol mono(meth)acrylate, hexanediol mono(meth)acrylate, diethylene glycol mono(meth)acrylate, polyethylene glycol mono(meth)acrylate, neopentyl glycol mono(meth)acrylate, hydroxypivalic acid neopentyl glycol ester mono(meth)acrylate, dipropylene glycol mono(meth)acrylate and the like; mono- and di(meth)acrylates of trihydric alcohols such as trimethylolethane mono(meth)acrylate, trimethylolethane di(meth)acrylate, trimethylolpropane mono(meth)acrylate, trimethylolpropane di(meth)acrylate, glycerin mono(meth)acrylate, glycerin di(meth)acrylate; hydroxyl containing (meth)acrylates of tetra- or higher hydric alcohols such as pentaerythritol mono(meth)acrylate, pentaerythritol di(meth)acrylate, pentaerythritol tri(meth)acrylate, dipentaerythritol mono(meth)acrylate, dipentaerythritol mono(meth)acrylate, dipentaerythritol di(meth)acrylate, dipentaerythritol tri(meth)acrylate, dipentaerythritol tetra(meth)acrylate, dipentaerythritol penta(meth)acrylate and the like; hydroxyl containing (meth)acrylated ε-caprolactone adduct of these alcohols; and epoxy acrylated compounds obtained by adding (meth)acrylic acid to epoxy compounds such as various monoglycidyl ethers, diglycidyl ethers of dihydric alcohols such as ethylene glycol diglycidyl ether, polyethylene glycol diglycidyl ether, propylene glycol glycidyl ether, polypropylene glycol diglycidyl ether, neopentyl glycol diglycidyl ether, 1,6-hexanediol diglycidyl ether, etc., glycidyl ethers of polyhydric alcohols such as glycerin diglycidyl ether, trimethylolpropane triglycidyl ether, etc., and glycidyl ethers of compounds having phenolic hydroxyl group such as diglycidyl ether of bisphenol A, etc.

The term "di-, tri-, tetra- and penta(meth)acrylate" include a compound wherein a part thereof is acrylated and another part thereof is methacrylated.

The above compound can be used alone or in combination thereof. Further, a (meth)acrylate compound containing no hydroxyl group can be used together with the above compound.

The compound having a (meth)acryloyl group and hydroxyl group should be incorporated in a crosslinked network upon irradiation. Therefore, the compound containing at least two (meth)acryloyl groups in the molecule is preferred. Then, when a mono(meth)acrylate compound is used, it is preferable to use the compound together with a compound containing at least two (meth)acryloyl groups.

The content of the compound having a (meth)acryloyl group and hydroxyl group to be used in the present invention has a remarkable influence on stain resistance and it is necessary that the compound is incorporated in the crosslinked network. In order to manifest good stain resistance, a hydroxyl group should be contained in the effective component of the radiation curable resin composition in an amount ranging between 100 to 5,000 equivalent/$10^6$ g, preferably, 200 to 4,500 equivalent/$10^6$ g. When the amount is less than 100 equivalent/$10^6$ g, good stain resistance is hardly obtained and, when the amount exceeds 5,000 equivalent/$10^6$ g, the hydrophilic nature becomes too high, which results in deterioration of water resistance.

The production of the radiation curable resin composition of the present invention is carried out by, for example, a method comprising formulating the polyfunctional (meth)acrylate compound after the completion of synthesis of the urethane acrylate resin. Alternatively, there can be used a method comprising adding the polyfunctional (meth)acrylate compound during the synthesis of the urethane acrylate resin.

As pigments used in the radiation curable coating composition of the present invention, various conventional inorganic pigments and organic pigments can be used. Examples of the inorganic pigments include extender pigments such as barytes powder, precipitated barium sulfate, heavy calcium carbonate, precipitated calcium carbonate, talc, clay, alumina white, white carbon and the like; white pigments such as basic lead carbonate, chinese white, zinc sulfide, lithopone, titanium dioxide and the like; blue pigments such as ultramarine, Prussian blue, cobalt blue and the like; green pigments such as chrome oxide, viridian chrome green and the like; yellow, orange and red pigments such as chrome yellow, molybdate orange, cadmium pigments, titanium yellow, yellow oxide, blood red and the like; black pigments such as black iron oxide, carbon black and the like; metallic pigments such as aluminum powder, bronze powder and the like; corrosion resistant pigments such as red lead, lead suboxide powder, cyanamide lead, MIO, zinc chromate, strontium chromate, zinc dust, copper suboxide and the like; stain resistant pigments and the like. Further, examples of organic pigments include azo pigments, phthalocyanine pigments, quinacridone pigments, isoindolinone pigments, vat pigments, dyeing lake pigments and the like.

In the present invention, the ratio of the radiation curable composition to the pigment varies depending upon a particular kind of pigment to be used. Normally, the ratio is 98 to 10% by weight of pigment to 2 to 90% by weight of the radiation curable resin composition. More preferably, the ratio is 97 to 30% by weight of the pigment to 3 to 70% by weight of the radiation curable resin composition.

The pigment can be dispersed according to the conventional method. As the dispersing machine, any of dispersing machines normally used in the coloring material industry, for example, sand grind mill, ball mill, dissolver and the like can be used.

An organic solvent can be added to the radiation curable resin composition and radiation curable coating composition of the present invention.

The organic solvent should be a volatile solvent, and it is necessary that almost all or all of the solvent should be volatilized by heating, drying, etc. before radiation cure. As the solvent which can be used, for example, there are ketones such as acetone, methyl ethyl ketone, methyl isobutyl ketone, cyclohexanone and the like; esters such as methyl acetate, ethyl acetate and the like; ethers such as tetrahydrofuran, dioxane, ethylene glycol monoethyl ether and the like; aromatic hydrocarbons such as benzene, toluene, xylene and the like; aliphatic hydrocarbons such as hexane, heptane and the like; and alcohols such as methanol, ethanol, isopropyl alcohol and the like; and the mixture thereof. The solvent used in the synthesis of the urethane acrylate resin of the present invention can also be used as such.

In addition, for reducing the viscosity of a system, a reactive diluent such as a monofunctional compound and the like can also be used. However, since the reactive diluent is incorporated into a crosslinked network after completion of radiation cure, the use thereof should not interfere with the effect of the present invention.

In the radiation curable coating composition of the present invention, other components can be further added in addition to the above components. Examples of the components include various additives, catalysts, antioxidants, UV absorbing agents, antistatics agents, antfoaming agents, plasticizers, desiccants, surfactants, wetting agents, introfiers, photopolymerization initiators, stabilizing agents and the like. These components can be appropriately used in so far as they do not interfere with the effect of the present invention.

The radiation curable resin composition and radiation curable coating composition of the present invention can be applied on various materials such as plastic, slate, plaster, paper, wood and the like.

Further, the radiation curable coating composition is applied on a material used for a precoated metal to form a cured film. Examples of the above material include steel plates such as galvanized steel plate, cold-rolled steel plate, electro-galvanized steel plate, aluminized steel plate, tin plate, tin-free steel plate, stainless steel plate and the like, and aluminum plate. Steel plates are preferred because of excellent balance between various properties of the precoated metal and appearance thereof. In order to provide adhesion property and corrosion resistance of the coating, materials which have been subjected to pretreatment such as treatment with amorphous phosphate, treatment with amorphous chromate, treatment with a composite oxide film or the like can be used.

The film structure formed on the above materials with the composition of the present invention may be a monolayer structure formed with one kind of the composition or a multilayer structure having two or more layers formed with different kinds of the compositions. Further, the composition of the present invention can be applied on the material, directly, or a primer is firstly applied on the material and then the composition of the present invention can be applied thereon.

When coating is carried out by using the composition of the present invention, various conventional methods can be used. For examples, there are spray coating, roller coating, curtain flow coating, knife coating and the like.

The film is cured by irradiation. The radiation used in the present invention employs, for example, ultraviolet rays, electron rays, γrays, neutron rays and the like. In the case of using ultraviolet rays, it is preferred to add a photopolymerization initiator to the radiation curable coating composition.

Examples of the photopolymerization initiator include acetophenone, benzophenone, benzoin ethyl ether, benzyl methyl ketal, benzyl ethyl ketal, benzoin isobutyl ketone, hydroxydimethyl phenyl ketone, 1-hydroxycyclohexyl phenyl ketone, 2,2'-diethoxyacetophenone, Michler's ketone, 2-hydroxy-2-methylpropiophenone, benzyl, diethylthioxanthon, 2-chlorothioxanthon, benzoylethoxyphophine oxide, 1-trimethylbenzoyl diphenylphosphine oxide and the like. If necessary, a photosensitizer such as n-butylamine, di n-butylamine, triethylamine or the like can be used.

As the electron ray irradiation equipment, there can be used a scanning type equipment or curtain beam type equipment, and the irradiation dose is 1 to 20 Mrad, preferably, 2 to 15 Mrad. When the irradiation dose is less than 1 Mrad, the curing reaction is insufficient and, when the irradiation dose exceeds 20 Mrad, energy efficiency used for curing is lowered and crosslinking proceeds excessively and, therefore, it is undesirable.

The precoated metal using the resin and resin composition of the present invention comprises a top coat of the above radiation curable coating composition (1), a intercoat layer (2) and optionally an undercoat layer (3).

In this case, the resin to be used for the intercoat is appropriately selected from the conventional thermoset resins and radiation curable resins. As the thermoset resin, for example, there can be used amine alkyds, oil-free polyesters, vinyl modified alkyds, solution-type vinyl, organosol, plastisol, epoxy, epoxy esters, baking-type acryl, silicone alkyds, silicone acryl, silicone polyester, polyvinyl fluoride, polyvinylidene fluoride and the like. Further, as the radiation curable resin, for example, there can be used polyester acrylate, epoxy acrylate, polyurethane acrylate, polyether acrylate, oligoacrylate, alkyd acrylate, polyol acrylate and the like. The radiation curable resin composition of the present invention can be used as this resin composition.

The colored intercoat layer is composed of the above resin and pigment, and optionally various additives.

As the pigment, there can be used the above various pigments used in the coloring material industry. The conventional ratio and dispersion method thereof can be employed.

Optionally, the undercoat layer is used for mainly providing adhesion property and corrosion resistance to the surface of the steel plate. The resin to be used is not limited to a specific one in so far as it can manifest the desired properties. Examples thereof include acryl resin, polyester resin having good workability, and epoxy resin having good adhesion property, corrosion resistance and chemical resistance and the like.

The precoated metal of the present invention can be obtained by forming, if necessary, an undercoat layer on a material used for the above precoated metal, coating a composition for the above (colored) intercoat thereon according to the conventional method, drying and curing the composition to form an intercoat layer and applying the radiation curable coating composition of the present invention on the (colored) intercoat layer. Thus, there can be obtained a precoated metal having good solvent resistance, boilproof properties and weather resistance which have never been obtained in the conventional precoated metal as well as good appearance, design and balance between hardness and workability.

The radiation curable resin and radiation curable coating composition of the present invention have good storage stability as well as good radiation curing property. Particularly, the film obtained after curing has good solvent resistance, boilproof property and weather resistance. Therefore, the resin composition and coating composition of the present invention can be used for various applications such as a radiation curable coating agent, ink coating, resist material and the like. The coating composition is particularly useful for a precoated metal.

Further, according to the present invention, novel and high performance precoated metal is produced having the above good properties that are not obtained in a conventional precoated metal as well as excellent appearance, design and workability.

The following Examples and Comparative Examples further illustrate the present invention in detail but are not to be construed to limit the scope thereof. In the Examples and Comparative Examples, all "parts" are by weight unless otherwise stated.

(1) Preparation of Copolymerized Polyester Polyol

Dimethyl tetraphthalate (290 parts), dimethyl isophthalate (290 parts), ethylene glycol (444 parts), neopentyl glycol (400 parts) and tetrabutoxy titanate (0.68 part) were charged in an autoclave equipped with a thermometer and a stirrer and heated at 150 to 230° C. for 120 minutes to produce an ester interchange reaction. Then, adipic acid (292 parts) was added and the reaction was continued at 220° to 230° C. for 1 additional hour. After the temperature of the reaction system was raised to 250° C. over 30 minutes, the pressure of the system was gradually reduced to 10 mmHg over 45 minutes. The reaction was continued for 1 additional hour. The copolymerized polyester polyol (a) thus obtained had the molecular weight of 2,000 and the acid value of 5 equivalent/$10^6$ g.

According to the same manner, copolymerized polyester polyols (b) to (e) obtained. They are shown in Table 1. The resin composition was analyzed by NMR.

TABLE 1

|  | Copolymerized polyester polyol | | | | |
| --- | --- | --- | --- | --- | --- |
|  | a | b | c | d | e |
| Carboxylic acid component (mole %) | | | | | |
| Terephthalic acid | 30 | 30 | — | 50 | — |
| Isophthalic acid | 30 | 30 | 50 | 50 | — |
| Adipic acid | 40 | 40 | 50 | — | 100 |
| Glycol component (mole %) | | | | | |
| Ethylene glycol | 55 | 50 | — | 50 | — |
| Neopentyl glycol | 45 | 50 | 100 | 50 | 50 |
| Hexanediol | — | — | — | — | 50 |
| Properties | | | | | |
| Molecular weight | 2000 | 10000 | 560 | 5000 | 2000 |
| Acid value (eq./$10^6$ g) | 5 | 1 | 12 | 2 | 10 |

(2) Preparation of Urethane Acrylate Resin

Preparation 1

The copolymerized polyester polyol (a) obtained in the above (1) (100 parts), toluene (80 parts) and methyl ethyl ketone (80 parts) were charged in a reaction vessel equipped with a thermometer, a stirrer and a reflux condenser. After dissolution of the copolymerized polyester polyol (a), isophorone diisocyanate (24.4 parts) and dibutyltin dilaurate (0.03 part) were added and the reaction was carried out at 70° to 80° C. for 3 hours to obtain an isocyanate terminated prepolymer. The reaction vessel was cooled to 60° C. and pentaerythritol triacrylate (36 parts) was added. Then, the reaction was carried out at 60° to 70° C. for 6 hours to obtain a solution of an urethane acrylate resin (A) having the concentration of the active component of 50% by weight.

The molecular weight of the urethane acrylate resin (A) was 3,000.

According to the same manner, urethane acrylate resins (B) to (F) were obtained from the above polyester polyols (b) to (e) obtained in the above (1). The urethane acrylate resins thus obtained are shown in Table 2.

TABLE 2

|  | Urethane acrylate resin | | | | | |
| --- | --- | --- | --- | --- | --- | --- |
|  | A | B | C | D | E | F |
| Polyester polyol | | | | | | |
| a | 100 | — | — | — | 100 | — |
| b | — | 100 | — | — | — | — |
| c | — | — | 100 | — | — | — |
| d | — | — | — | 100 | — | — |
| e | — | — | — | — | — | 100 |
| Isophorone diisocyanate | 24.4 | 4.9 | 59.9 | — | — | 24.4 |
| Diphenylmethane diisocyanate | — | — | — | 11 | 27.5 | — |
| Pentaerythritol triacrylate | 36 | 7.2 | — | 8 | — | 36 |
| Glycerin diacrylate | — | — | 39 | — | 10 | — |
| Hydroxypivalic | — | — | — | 2.2 | 7.5 | — |

TABLE 2-continued

|  | Urethane acrylate resin | | | | | |
|---|---|---|---|---|---|---|
|  | A | B | C | D | E | F |
| acid neopentyl glycol ester | | | | | | |
| Molecular weight | 3000 | 11000 | 2000 | 10000 | 20000 | 3100 |
| Urethane bond concentration (eq./$10^6$ g) | 1370 | 390 | 2980 | 730 | 1520 | 1370 |
| (Meth)acryloyl group concentration (eq./$10^6$ g) | 2260 | 650 | 1830 | 660 | 640 | 2260 |

Preparation 2

The copolymerized polyester polyol (a) obtained in the above (1) (100 parts), toluene (63.7 parts) and methyl ethyl ketone (63.7 parts) were charged in a reaction vessel equipped with a thermometer, a stirrer and a reflux condenser. After the dissolution of the copolymerized polyester polyol (a), isophorone diisocyanate (5.6 parts) and dibutyltin dilaurate (0.01 part) were added and the reaction was carried out at 70° to 80° C. for 3 hours to obtain OH terminated prepolymer. Then, isophorone diisocyanate (11 parts) was added and the reaction was carried out at 70 to 80° C. for 3 hours. Further, glycerin diacrylate (10.8 parts) was added and the reaction was carried out at 60° to 70° C. for additional 3 hours to obtain a solution of an urethane acrylate resin (H) having the concentration of the active component of 60% by weight.

The molecular weight of the urethane acrylate resin (H) was 5,300.

According to the same manner, the urethane acrylate resins (G) and (I) to (M) were obtained from the above polyester polyols (a) to (e). The urethane acrylate resins thus obtained are shown in Table 3.

was 20 μm by using a wire bar. Then, the coated steel plate was dried at 80° C. for 20 minutes and electron irradiation was carried out at the accelerating voltage of 165 KV, the current of 5 mA and the irradiation dose of 10 Mrad to form a cured film on the steel plate.

According to the same manner, cured films were formed on steel plates by using the urethane acrylate resins (B) to (F).

The results of evaluation for stability of the solution of the resin composition and properties of the cured film are shown in Table 4.

TABLE 4

| Urethane acrylate resin | Storage stability | Properties of cured film | | |
|---|---|---|---|---|
| | | Solvent resistance | Boilproof properties | Weather resistance |
| Example 1 | | | | |
| A | good | good | good | good |
| B | " | " | " | " |
| C | " | " | " | " |
| D | " | " | " | " |
| E | " | " | " | " |
| Comparative Example 1 F | inferior | slightly inferior | inferior | inferior |

TABLE 3

|  | Urethane acrylate resin | | | | | | |
|---|---|---|---|---|---|---|---|
|  | G | H | I | J | K | L | M |
| Polyester polyol | | | | | | | |
| a | 100 | 100 | — | — | — | — | 100 |
| b | — | — | 100 | — | — | — | — |
| c | — | — | — | — | 100 | — | — |
| d | — | — | — | 100 | — | — | — |
| e | — | — | — | — | — | 100 | — |
| Isophorone diisocyanate | 24.4 | 16.6 | 4.9 | 9.8 | 59.9 | — | — |
| Tolylene diisocyanate | — | — | — | — | — | 19.1 | 9.3 |
| Pentaerythritol triacrylate | 36 | — | 7.2 | 14.4 | — | 36 | 2 |
| Glycering diacrylate | — | 10.8 | — | — | — | — | — |
| Hydroxyethyl acrylate | — | — | — | — | 20.9 | — | — |
| Molecular weight | 3000 | 5300 | 11000 | 6050 | 2020 | 3000 | 3500 |
| Urethane bond concentration (eq./$10^6$ g) | 1370 | 1170 | 390 | 710 | 2980 | 1420 | 960 |
| (Meth)acryloyl group concentration (eq./$10^6$ g) | 2260 | 790 | 650 | 1170 | 1000 | 2340 | 180 |

EXAMPLE 1 AND COMPARATIVE EXAMPLE 1

The above urethane acrylate resin (A) was applied on a galvanized steel plate of 0.3 mm in thickness wherein an epoxy primer has been applied in the thickness of 3 μm so that the thickness of coated layer after drying

EXAMPLE 2 AND COMPARATIVE EXAMPLE 2

To urethane acrylate resin (G) (50 parts, solution: 100 parts) was added pentaerythritol tetraacrylate (50 parts) and the mixture was stirred until a homogeneous solution was obtained. Thus, a transparent solution of a resin composition (I) was provided.

The solution of the resin composition (I) was stored at 40° C. for 90 days and stability thereof was evaluated. As a result, no gelation was observed.

Further, the resin composition was applied on a steel plate so that the thickness of the coated layer after drying was 20 μm by selecting a wire bar used. Then, the coated steel plate was dried at 80° C. for 20 minutes. After the solvent was removed, electron irradiation was carried out at the accelerating voltage of 165 KV, the current of 5 mA and the irradiation dose of 10 Mrad to form a cured film on the steel plate.

According to the same manner, solutions of the resin compositions (II) to (X) were prepared and the cured film was formed on a steel plate. The formulation of each resin composition is shown in Table 5.

The results of evaluation for stability of the resin composition solution and properties of the cured film are shown in Table 6.

TABLE 5

| | Urethane acrylate resin (parts) | Polyfunctional (meth)acrylate compound (parts) | (Meth)acryloyl group concentration (eq./$10^6$ g) |
|---|---|---|---|
| Example 2 | | | |
| I | G (50) | pentaerythritol tetraacrylate (50) | 6810 |
| II | G (40) | pentaerythritol tetraacrylate (40) glycerin diacrylate (20) | 7320 |
| III | G (30) | pentaerythritol tetraacrylate (70) | 8630 |
| IV | H (60) | trimethylolpropane triacrylate (40) | 4530 |
| V | I (50) | dipentaerythritol hexaacrylate (50) | 5520 |
| VI | J (70) | pentaerythritol triacrylate (30) | 3840 |
| Comparative Example 2 | | | |
| VII | polyester polyol (a) (50) | glycerin diacrylate (50) | 4670 |
| VIII | K (70) | hydroxyethyl acrylate (30) | 3290 |
| IX | L (60) | glycerin diacrylate (40) | 5140 |
| X | M (70) | pentaerythritol tetraacrylate (30) | 3540 |

TABLE 6

| Composition | Storage stability | Gel (wt %) | Properties of cured film | | |
|---|---|---|---|---|---|
| | | | Solvent resistance | Boilproof properties | Weather resistance |
| Example 2 | | | | | |
| I | good | 98 | good | good | good |
| II | " | 100 | " | " | " |
| III | " | 99 | " | " | " |
| IV | " | 100 | " | " | " |
| V | " | 99 | " | " | " |
| VI | " | 97 | " | " | " |
| Comparative Example 2 | | | | | |
| VII | " | 47 | inferior | inferior | slightly inferior |
| VIII | " | 70 | inferior | slightly inferior | slightly inferior |
| IX | inferior | 90 | slightly inferior | slightly inferior | inferior |
| X | inferior | 27 | inferior | inferior | inferior |

Evaluation was carried out according to the following manner.

Storage Stability

The solution of the resin composition was stored at 40° C. for 90 days and the presence of abnormality such as gelation or separation was visually evaluated according to the following criteria:
good: No abnormality was observed.
inferior: Abnormality such as gelation or separation was arisen.

Gel (wt %)

The cured film was placed in an extraction thimble and extracted with methyl ethyl ketone for 24 hours by using Soxhlet extractor. After drying the residue in the extraction thimble, it was weighed and the weight ratio (%) of an insoluble matter was calculated based the weight before extraction to give the gel (wt %).

Solvent Resistance

After rubbing the surface of a cured film 50 strokes with a gauze soaked with xylene, the surface state was evaluated according to the following criteria:
good: No abnormality was observed.
slightly inferior: Scratch was observed.
inferior: The coated film was peeled off.

Boilproof Properties

After soaking a coated steel plate in boiling water and boiling for two hours, the surface state of the coated film was visually evaluated according to the following criteria:
good: No abnormality was observed.
slightly inferior: Slight dulling was observed or the coated film was slightly peeled off.
inferior: Remarkable dulling was observed or the coated film was peeled off.

Weather Resistance

By using an accelerated weathering machine (QUV), change of gloss after exposure of 300 hours was visually evaluated according to the following criteria:
good: No abnormality was observed.
slightly inferior: Gloss was slightly lowered.
inferior: Gloss was remarkably lowered.

Stain Resistance

By using three felt tipped markers of red, blue and black, lines were drawn on the coated surface. After standing for 24 hours, lines were wiped off with a gauze soaked with ethanol and traces of lines were evaluated according to the following criteria:
good: No trace was observed.;
slightly inferior: Trace was slightly remained.;
inferior: Trace was clearly remained.

Hardness

By using pencils, "UNI" manufactured by Mitsubisi Pencil Co., Ltd., Japan, the hardness of a coated film was expressed by the hardness of the pencil which was one grade softer than that making scratch on the film.

Workability

By using a coated film bending machine manufactured by Taiyu Kizai Co., Ltd., Japan, the sample was bent at 180°. Workability was express by the diameter of a smallest mandrel which did not form cracking on the coated surface by this bending. The smallest mandrel was 2 mm $\phi$.

EXAMPLE 3 AND COMPARATIVE EXAMPLE 3

To each solution of the resin compositions (I), (IV) and (V) of Example 2 (100 parts) was added titanium oxide (15 parts) and the mixture was kneaded to obtain a white enamel coating composition (XI), (XII) and (XIII), respectively.

Each of these coating compositions was applied on a steel plate so that the thickness of the coated layer after drying was 20 μm by selecting a wire bar. Then, the steel plate was dried at 80° C. for 20 minutes. After removing the solvent, electron irradiation was carried out at the accelerating voltage of 165 KV, the current of 5 mA and the irradiation dose of 10 Mrad to form a white coated steel plate.

Regarding the white enamel film on the steel plate, solvent resistance, boilproof properties and weather resistance were evaluated according to the same manner as described in Example 2. The results are shown in Table 7.

Likewise, according to the same manner, the white enamel coating compositions (XIV) and (XV) were obtained from the resin compositions (VII) and (X) and evaluated. The results are shown in Table 7.

TABLE 7

| Coating composition | Solvent resistance | Boilproof properties | Weather resistance |
|---|---|---|---|
| Example 3 | | | |
| XI | good | good | good |
| XII | " | " | " |
| XIII | " | " | " |
| Comparative Example 3 | | | |
| XIV | inferior | inferior | slightly inferior |
| XV | inferior | inferior | inferior |

EXAMPLE 4 AND COMPARATIVE EXAMPLE 4

A white coating composition composed of Vylon GK130 (100 parts, copolymerized polyester resin manufactured by Toyo Boseki Kabushiki Kaisha, Japan), melamine resin (20 parts), titanium dioxide (100 parts), p-toluenesulfonic acid solution (0.25 part) as a catalyst, Polyflow S (0.50 part, manufactured by Kyoeisya Yushi Co., Ltd, Japan) as a surface smoothing agent and cyclohexanone and solvesso #150 (50 parts) as solvents was applied on a galvanized steel plate of 0.5 mm in thickness having a thermoset epoxy acrylate primer layer of of 3 mμ in dry thickness with a bar coater, followed by baking and drying to form a white intercoat layer of 20 mμ in thickness.

Further, the radiation curable resin composition (I) used in Example 2 was applied on the above white intercoat layer so that the thickness of the coated layer after drying was 10 μm by selecting a wire bar. Then, the steel plate was dried at 80° C. for 20 minutes. After removing the solvent, electron irradiation was carried out at the accelerating voltage of 165 KV, the current of 5 mA and the radiation dose of 10 Mrad to form a top coat layer to obtain a laminated precoated steel plate.

The properties of the precoated plate before and after formation of the topcoat layer are shown in Table 8. As is clear from Table 8, the properties of the precoated steel plate is improved.

TABLE 8

| | Example 4 | Comp. Example 4 |
|---|---|---|
| Top coat layer | formed | not formed |
| Appearance of film* | excellent | good |
| Gloss (%) | 97 | 85 |
| Bending workability (T-bend) | 2T | 2T |
| Pencil hardness (According to JIS-K5400 6.14) | 2H | F |
| Solvent resistance | good | slightly inferior |
| Stain resistance | good | slightly inferior |
| Boilproof properties | good | slightly inferior |
| Weather resistance | good | good or slightly inferior |

In Table 8, appearance of film was evaluated visually according to the following criteria:

excellent: Appearance such as color, sharpness, gloss, etc. was excellent.

good: Appearance such as color, sharpness, gloss, etc. was good.

inferior: Appearance such as color, sharpness, gloss, etc. was inferior.

Bending workability was determined as follows:

The coated metal plate sample was bent at 180° by putting certain sheets of the same metal plate as that used for the production of the coated metal between the bending planes. Workability was expressed by the number of the metal plates put between the bending planes which did not form cracking on the coated surface by the bending. For example, "2T" showed that cracking were formed when three sheets of the metal plate was put between the bending planes.

A smaller number of the metal plate means better bending workability.

EXAMPLE 5

According to the same manner as described in the above production of the polyester polyol (1), polyester polyol (f) [TPA/IPA/AA//EG/NPG=30/30/40//55/45 (molar ratio); molecular weight: 1,800; and acid value: 5 equivalent/$10^6$ g], polyester polyol (g) [TPA/IPA/AA//EG/NPG=15/15/70//50/50 (molar ratio); molecular weight of 3,000; and acid value: 10 equivalent/$10^6$ g], polyester polyol (j) [TPA/IPA//EG/NPG=50/50//50/50 (molar ratio); molecular weight: 2,000; and acid value: 5 equivalent/$10^6$ g]and polyester polyol (k) [adipic acid//NPG/hexanediol=100//30/70 (molar ratio); molecular weight: 2,000; and acid value: 7 equivalent/$10^6$ g] were produced and, according to the same manner as described in the above production of urethane acrylate resin (2), Preparation 1, the polyurethane acrylate resins B-1 to B-5 (Table 9) were prepared. Then, according to the same manner as described in Example 2, precoated metals were produced and their properties were evaluated. The results are shown in Table 10.

TABLE 9

| | Urethane acrylate resin | | | | |
|---|---|---|---|---|---|
| | B-1 | B-2 | B-3 | B-4 | B-5 |
| Polyester polyol | | | | | |
| f | 100 | 100 | 100 | — | — |
| g | — | — | — | 100 | — |
| j | — | — | — | — | 50 |
| k | — | — | — | — | 50 |
| Diphenylmethane diisocyante | 28 | — | — | — | 25 |
| Tolylene diisocyanate | — | — | — | 12 | — |
| Isophorone diisocyanate | — | 28 | 27 | — | — |
| Pentaerythritol triacrylate | 7 | — | 40 | 22 | 7 |
| 3-acryloyloxy glycerin monomethacrylate | — | 30 | — | — | — |
| Hydroxypivalic acid neopentyl glycol ester | 9 | — | — | — | 8 |
| | | | | | (parts) |
| Molecular weight | 12000 | 2700 | 2800 | 3900 | 14000 |
| Solvent composition (wt %) | MEK(50) toluene(50) | cyclohexanone(50) solvesso#150(50) | cyclohexanone(50) solvesso#150(50) | MEK(50) toluene(50) | MEK(50) toluene(50) |
| Urethane bond concentration (eq./$10^6$ g) | 1560 | 1600 | 1460 | 1030 | 1430 |
| (Meth)acryloyl group concentration (eq./$10^6$ g) | 490 | 1770 | 2410 | 1650 | 500 |

EXAMPLE 6

Titanium oxide (80 parts) was added to the effective component of the composition used in Example 5-4 or

TABLE 10

| (Composition) | Example 5-1 | Example 5-2 | Example 5-3 | Example 5-4 |
|---|---|---|---|---|
| Monomer (A) having unsaturated double bond and hydroxyl group (parts) | pentaerythritol triacrylate (52) glycerol monomethacrylate (3) | 3-acryloyloxy glycerin monomethacrylate (40) | pentaerythritol triacrylate (35) | pentaerythritol triacrylate (30) |
| Oligomer and/or polymer (B) having unsaturated double bond (parts) | B-1 (45) | B-2 (60) | B-3 (65) | B-3 (70) |
| Other component (parts) | — | — | — | pentaerythritol tetraacrylate (35) |
| Content of hydroxyl group (eq./$10^6$ g) | 2120 | 1870 | 1170 | 745 |
| (Meth)acryloyl group concentration (eq./$10^6$ g) | 5640 | 4800 | 5090 | 6430 |
| (Precoated steel plate) | | | | |
| Stain resistance | 5 | 5 | 5 | 5 |
| Hardness | 2H | H | 2H | 3H |
| Workability | 4 mmφ OK | 2 mmφ OK | 2 mmφ OK | 6 mmφ OK |

| (Composition) | Example 5-5 | Example 5-6 | Comp. Example 5-1 | Comp. Example 5-2 |
|---|---|---|---|---|
| Monomer (A) having unsaturated double bond and hydroxyl group (parts) | pentaerythritol triacrylate (40) | pentaerythritol triacrylate (40) | — | — |
| Oligomer and/or polymer (B) having unsaturated double bond (parts) | B-4 (60) | B-5 (60) | B-1 (100) | B-4 (60) |
| Other component (parts) | — | — | — | trimethylolpropane triacrylate (40) |
| Content of hydroxyl group (eq./$10^6$ g) | 1340 | 1340 | 0 | 0 |
| (Meth)acryloyl group concentration (eq./$10^6$ g) | 5020 | 4330 | 490 | 5040 |
| (Precoated steel plate) | | | | |
| Stain resistance | 5 | 5 | 1 | 3 |
| Hardness | H | H | HB | H |
| Workability | 4 mmφ OK | 2 mmφ OK | 2 mmφ OK | 4 mmφ OK |

Comparative Example 5-2 (100 parts) to form a white coating composition.

By using the coating thus obtained, according to the same manner as described in Example 5 and Comparative Example 5, a cured film was formed on a steel plate having an epoxy primer layer of 3 μm in thickness.

Coating properties of the white coated steel plates are shown in Table 11 hereinafter. Dispersibility of the pigment was evaluated by 60° gloss.

ity such as 0T. On the other hand, the precoated metal using the resin (R) had folding workability of 5T. Regarding stain resistance, the precoated metals using the resins (P), (Q) and (U) were 4 to 5, while that using the resin (R) was 2.

TABLE 12

| | Urethane acrylate resin | | | | | |
|---|---|---|---|---|---|---|
| | N | O | P | Q | R | U |
| Polyester polyol | | | | | | |
| f | 50 | — | 50 | — | 100 | — |
| m | — | 50 | — | 50 | — | — |
| l | — | — | — | — | — | 50 |
| Polycarbonate polyol | | | | | | |
| A | 50 | 50 | — | — | — | — |
| B | — | — | 50 | 50 | — | 50 |
| Diphenylmethane diisocyanate | 27 | 19 | 27 | 27 | 27 | — |
| Isophorone diisocyanate | — | — | — | — | — | 20 |
| Pentaerythritol triacrylate | 14 | 10 | 14 | 14 | 14 | 14 |
| Glycerin monoacrylate | — | 2 | — | — | — | — |
| Hydoxypivalic acid neopentyl glycol ester | 8.4 | 3.1 | 8.4 | 8.4 | 8.4 | 7.0 |
| Molecular weight | 15000 | 20000 | 18000 | 13000 | 15000 | 16000 |
| Urethane bond concentration (eq./$10^6$ g) | 1450 | 1130 | 1450 | 1450 | 1450 | 1280 |
| (Meth)acryloyl group concentration (eq./$10^6$ g) | 940 | 850 | 940 | 940 | 940 | 1000 |

TABLE 11

| | Example 6 | Comp. Example 6 |
|---|---|---|
| Stain resistance | 5 | 3 |
| Hardness | 3H | H |
| Workability | 6 mmφ, OK | 6 mmφ, OK |
| 60° gloss | 95 | 80 |

EXAMPLE 7

By using the above polyester polyol (f), polyester polyol (m) (molecular weight: 5,000) composed of 100 mole % of 1,4-hexahydrophthalic acid as the acid component, and 50 mole % of ethylene glycol and 50 mole % of cyclohexane dimethanol as the alcohol component, and polyester polyol (l) (molecular weight: 3,000) composed of 50 mole % of 1,4-hexahydrophthalic acid and 50 mole % of adipic acid as the acid component, and 50 mole % of neopentyl glycol and 50 mole % of ethylene glycol, the polyurethane acrylates (N), (O), (P), (Q), (R) and (U) as shown in Table 12 were obtained. Regarding the polyurethane acrylates (N) and (O), according to the same manner as described in Example 2, gel (wt %) and mechanical properties of films obtained by curing with electron irradiation at the irradiation dose of 5 Mrad were evaluated. As a result, gel (wt %) were 90% and 92%, respectively.

Regarding the polyurethane acrylate resins (P), (Q), (R) and (U), according to the same manner as described in Example 2, precoated metals were produced. As a result, the precoated metals using the resins (P), (Q) and (U) had pencil hardness of 2H and adhesion property of 100/100, although they had excellent folding workabil- In Table 12, polycarbonate polyol A and polycarbonate B are represented by the formulas:

Polycarbonate polyol A:

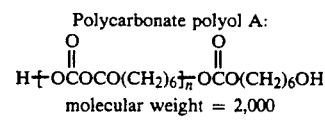

molecular weight = 2,000

Polycarbonate polyol B:

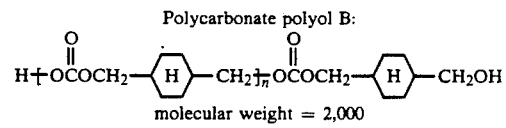

molecular weight = 2,000

EXAMPLE 8 AND COMPARATIVE EXAMPLE 8

According to the same manner as described for the production of the polyester, polyester polyols (h) and (i) having the compositions as shown in Table 13 were synthesized. By using the polyester polyols, the urethane acrylate resins S-1 to S-4 were obtained (Table 14). White coated steel plates were made according to the same manner as described in Example 6 and their properties were evaluated.

The result are shown in Table 15.

Further, by using a white coating composition which had been allowed to stand for 24 hours after its production, the same coating test was repeated. However, regarding S-1 to S-4, deterioration of properties was not observed.

Sharpness and gloss was evaluated as follows:
Sharpness:
Gd value was determined by using a sharpness-glossmeter (PGD IV type, manufactured by Japan Color Laboratory, Japan). The lager value means better sharpness.

Gloss:
Mirror reflectances at angles of 60° and 20° were determined by using a glossmeter (TC-108D type, manufactured by Tokyo Denshoku Co., Ltd., Japan).

TABLE 13

|  | Polyester polyol | |
|---|---|---|
|  | k | i |
| Dicarboxylic acid component (mole %) | | |
| terephthalic acid | 28 | 27 |
| isophthalic acid | 28 | 27 |
| adipic acid | 40 | 40 |
| Glycol component (mole %) | | |
| ethylene glycol | 55 | 55 |
| neopentyl glycol | 45 | 45 |
| Compound containing polar group | | |
| 5-sodium sulfoisophthalic acid | 4 | — |
| 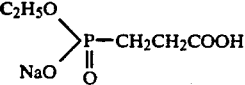 | — | 6 |
|  | h | i |
| Molecular weight | 2000 | 2000 |
| Acid value (eq./10$^6$ g) | 10 | 18 |
| Sulfonic metal base (eq./10$^6$ g) | 200 | — |
| Phosphonic metal base (eq./10$^6$ g) | — | 290 |

TABLE 14

|  | Urethane acrylate resin | | | |
|---|---|---|---|---|
|  | S-1 | S-2 | S-3 | S-4 |
| Polyester polyol | | | | |
| h | 100 | — | 50 | 100 |
| i | — | 100 | 50 | — |
| Polyisocyanate | | | | |
| 2,4-tolylene diisocyanate | 19 | 19 | — | 19 |
| diphenylmethane diisocyanate | — | — | 26 | — |
| Pentaerythritol triacrylate | 30 | 30 | 15 | — |
| Neopentyl glycol | — | — | 5.0 | 12.3 |
| Properties | | | | |
| molecular weight | 2900 | 2400 | 19000 | 2600 |
| polar concentration (eq./10$^6$ g) | 140 | 190 | 170 | 150 |
| solvent cyclohexanone | 60 | 60 | 60 | 60 |
| Urethane bond concentration (eq./10$^6$ g) | 1470 | 1470 | 1420 | 1660 |
| (Meth)acryloyl group concentration (eq./10$^6$ g) | 2030 | 2030 | 1030 | 0 |

TABLE 15

|  | (Coating composition immediately after production) | | | | | | |
|---|---|---|---|---|---|---|---|
|  | White coating | Gloss 60° | Gloss 20° | Sharpness Gd value | Hardness | Workability | Cross-cut adhesion property | Stain resistance |
| Example 8 | S-1 | 97 | 90 | 0.70 | 2H | <2 mmφ | 100/100 | good |
| " | S-2 | 95 | 87 | 0.70 | 2H | <2 mmφ | 100/100 | " |
| " | S-3 | 94 | 86 | 0.68 | 2H | <2 mmφ | 100/100 | " |
| Comp. Example 8 | S-4 | 87 | 75 | 0.30 | F | <2 mmφ | 100/100 | inferior |

What is claimed is:

1. A radiation curable resin composition which comprises a radiation curable resin which is a reaction product of:

(1) a polyester polyol and/or a polycarbonate polyol,
(2) a diisocyanate,
(3) a polyfunctional (meth)acrylate containing a hydroxyl group therein which is selected from the group consisting of mono- or di-(meth)acrylates of triol compounds, hydroxyl group containing (meth)acrylates of tetrahydric or higher polyols and a mixture thereof, and optionally
(4) a compound having at least two active hydrogen atoms in the molecule thereof selected from the group consisting of a polyol and a polyamine other than those used as component (1) or (3), said resin having at least two (meth)acryloyl groups at one terminal end of the molecular chain thereof, the molecular weight of said resin being 1,000 to 50,000, the concentration of urethane bond thereof being not more than 3,000 equivalent/10$^6$ g and the concentration of (meth)acryloyl group thereof being 100 to 6,000 equivalent/10$^6$ g; and a (meth)acrylate compound;

the (meth)acryloyl group concentration in said composition being 400 to 9,000 equivalent/10$^6$ g and the hydroxyl group concentration in said composition being 100 to 5,000 equivalent/10$^6$ g.

2. A radiation curable resin composition according to claim 1, wherein both said polyester polyol and polycarbonate polyol are present, the polyester polyol of the radiation curable resin has a molecular weight of 500 to 19,000 the polycarbonate polyol of the radiation curable resin has a molecular weight of 500 to 20,000, the weight ratio of the polyester polyol to polycarbonate polyol is 1:9 to 9:1, and the (meth)acryloyl group concentration in the resin is 400 to 9,000 equivalent/10$^6$ g.

3. A radiation curable resin composition according to claim 1, wherein the polyester polyol of the radiation curable resin comprises a dicarboxylic acid component composed of not less than 40 mole % of an aromatic dicarboxylic acid and not more than 60 mole % of an aliphatic dicarboxylic acid, the molecular weight of the radiation curable resin being 1,000 to 20,000 and the (meth)acryloyl group concentration of the composition is 400 to 9,000 equivalent/10$^6$ g.

4. A radiation curable resin composition according to claim 3, wherein the (meth)acryloyl group concentration of the composition is 3,000 to 9,000 equivalent/10$^6$ g.

5. A precoated metal plate which comprises a base metal and a coat on at least one surface of the base metal formed by curing a radiation curable resin composition comprising a radiation curable resin which is a reaction product of:

(1) a polyester polyol and/or a polycarbonate polyol,
(2) a diisocyanate,
(3) a polyfunctional (meth)acrylate containing a hydroxyl group therein which is selected from the group consisting of mono- or di-(meth)acrylates of triol compounds, hydroxyl group containing (meth)acrylates of tetrahydric or higher polyols and a mixture thereof, and optionally (4) a compound having at least two active hydrogen atoms in the molecule thereof selected from the group consisting of a polyol and a polyamine other than those used as component (1) or (3), said resin having at least two (meth)acryloyl groups at one terminal end of the molecular chain thereof, the molecular weight of said resin being 1,000 to 50,000, the concentration of urethane bond thereof being not more than 3,000 equivalent/$10^6$ g and the concentration of (meth)acryloyl group thereof being 100 to 6,000 equivalent/$10^6$ g; and a (meth)acrylate compound containing a hydroxyl group therein;

the (meth)acryloyl group concentration in said composition being 400 to 9,000 equivalent/$10^6$ g and the hydroxyl group concentration in said composition being 100 to 5,000 equivalent/$10^6$ g.

* * * * *